No. 663,587. Patented Dec. 11, 1900.
L. SINGLE.
PACKING BOX FOR STEAM JOINTS.
(Application filed Jan. 22, 1900.)
(No Model.)
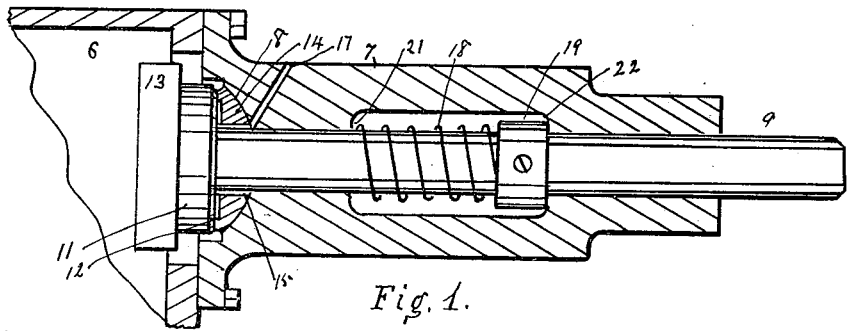
Fig. 1.
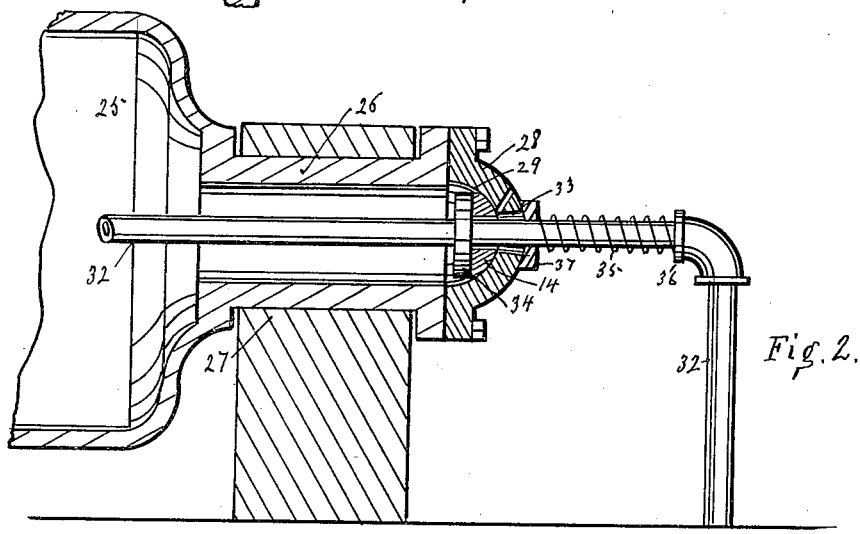
Fig. 2.
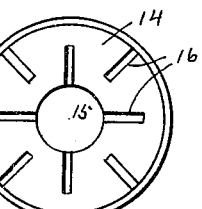 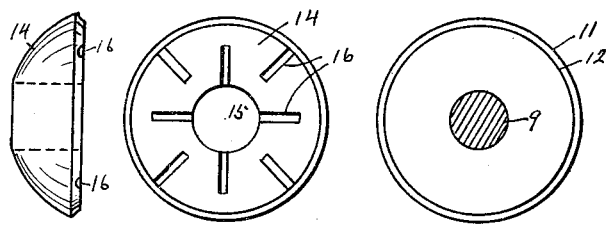 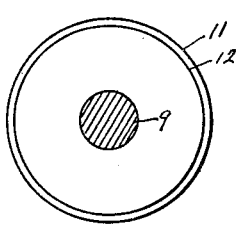
Fig. 3.   Fig. 4.   Fig. 5.
WITNESSES.
W. N. Gray.
John Francis
Leonard Single, INVENTOR.
By Robert S. Carr, Atty.

UNITED STATES PATENT OFFICE.

LEONARD SINGLE, OF HAMILTON, OHIO.

PACKING-BOX FOR STEAM-JOINTS.

SPECIFICATION forming part of Letters Patent No. 663,587, dated December 11, 1900.

Application filed January 22, 1900. Serial No. 2,397. (No model.)

*To all whom it may concern:*

Be it known that I, LEONARD SINGLE, a citizen of the United States, and a resident of Hamilton, Ohio, have invented certain new and useful Improvements in Packing-Boxes for Steam-Joints, of which the following is a specification.

My invention relates to packing-boxes for steam-joints wherein either rotative or oscillatory motion obtains; and the object of my improvement is to provide means to compensate for any wabble motion in the joint and prevent the leakage of steam. This object is attained in the following-described manner, as illustrated in the accompanying drawings, in which—

Figure 1 is a side elevation with parts in section, showing my improvement applied to the oscillatory valve-shaft of a Corliss engine; Fig. 2, a side elevation, with parts in section, of a rotative drum with stationary hollow shaft connected thereto; Fig. 3, an edgewise view of the adjustable disk; Fig. 4, an elevation of the plane bearing-surface of the disk, and Fig. 5 an elevation of the bearing-surface of the collar on the shaft.

In the drawings, 6 represents a portion of the steam-chest of a Corliss engine whereon bracket 7 is mounted. Said bracket is formed with a concave spherical seat 8 in one end and with bearings for valve-stem 9, that is mounted therein and adapted to oscillate rotatively. Collar 11 is formed on the inner end of the valve-stem and with a raised bearing-surface 12 on its outer face. Tenon 13, formed on the inner face of said collar, is adapted to engage with a mortise in the end of the cylindrical valve (not shown) and oscillate it rotatively in the usual manner. Metal disk 14, in form the segment of a sphere, contains a central opening 15 therethrough for the passage of the valve-stem and without contact therewith. The spherical surface of the disk is seated in the concave bearing 8, formed in the end of the bracket, and the plane side thereof is preferably raised to form a bearing-surface for the outer end of collar 11. Grooves 16 occupy radial lines in the plane surface of the disk and extend alternately from the periphery and the central opening thereof a short distance beyond the termination of the other and only a portion of the distance across the surface for the purpose of distributing on the bearing-surface of the collar the lubricating-oil admitted to the opening in the disk through the oil-hole 17 in the bracket.

The pressure of the steam on the inner end of the collar and valve-stem maintains the disk properly seated in the concave seat in the bracket and with its plane surface in frictional contact with the outer face of the collar. The disk does not partake of the rotative motion of the collar, owing to the sphericity of the opposite side thereof being in contact with the stationary bracket, and which wider area of contact offers greater frictional resistance to its movement than does its plane surface. Any wabbling motion of the valve-stem or of the collar causes the disk to automatically shift its position in its concave bearing to maintain its plane surface in close frictional contact with the surface of the collar at all times. Spring 18 encircles the valve-stem between collar 19, that is adjustably secured thereon, and shoulder 21, formed on the bracket. The purpose of the spring is to counteract any vacuum in the steam-chests of condensing-engines that might lift the collar from contact with the disk. Collar 19 may be adjusted against shoulder 22, formed on the bracket to relieve the disk of a portion of the pressure of the collar 11.

A modified form of application of the disk is shown in Fig. 2, wherein a steam-drum 25 is formed with hollow journals 26, that rotate in fixed bearings 27. A spherical cap 28, formed with a concave spherical bearing 29, is secured on the end of journal 26. A fixed hollow shaft 32 is inserted loosely through opening 33 in the cap and to the interior of the drum, if desired. A collar 34 is secured on the shaft and a short distance from the inner side of the cap to maintain the disk in proper position between the cap and collar by means of the pressure of the steam within the drum being exerted on the collar. Spring 35 encircles the shaft between collar or elbow 36 thereon and a concave washer 37, that rests against the end of the cap, as shown in Fig. 2. Said spring serves to keep the collar on the shaft in contact with the disk when a low steam-pressure is not sufficient to do so alone. Any wabble in the joint caused by wear or by the shaft being out of line with the axis of rotation of the drum causes the disk to shift its position in its concave seat to automatically maintain close frictional contact with the surface of the collar 34 and efficiently maintain the joints steam-tight.

Having fully described my improvement, what I claim as my invention, and desire to secure by Letters Patent of the United States, is—

1. In a steam-joint, the combination, with two members, one of which is provided with a concave seat that communicates with a steam-chamber and with an oil-channel communicating with the seat, and the other one projects through said seat, one of the members being rotatively mounted relatively to the other one, and the member that projects through the seat being provided with a collar upon each side of the seat, a plano-convex annular packing between one of the collars and the seat, one side of which is provided with radially-arranged grooves in communication with the oil-channel, and a spring between the other collar and the other side of the seat.

2. In a steam-joint, the combination, with an open bracket the inner end of which is provided with a concave seat that communicates with a steam-chamber, of an oscillatory stem through the bracket, the inner end of which is provided with a collar adjacent to the seat, a plano-convex packing between the collar and the seat, a collar upon the stem in the open portion of the bracket, and a spring upon the stem between said collar and the shoulder formed by the inner end of the open portion.

3. In a steam-joint, the combination, with a bearing provided with a concaved seat and an oil-conduit leading thereto, of a member through the bearing provided with a shoulder upon each side thereof, a perforated plano-convex packing upon the member between the seat and one of the shoulders, the plane side of which is grooved around its edge and provided with two series of radially-arranged grooves, one series extending from the grooved edge inward and the other series extending from the perforation outward, and a spring between the other shoulder and the other side of the bearing.

LEONARD SINGLE.

Witnesses:
C. H. SCHELL,
R. S. CARR.